United States Patent
Ito et al.

(10) Patent No.: US 7,596,240 B2
(45) Date of Patent: Sep. 29, 2009

(54) OBJECT TRACKING METHOD AND OBJECT TRACKING APPARATUS

(75) Inventors: Wataru Ito, Kodaira (JP); Miyuki Fujii, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 429 days.

(21) Appl. No.: 10/895,828

(22) Filed: Jul. 22, 2004

(65) Prior Publication Data

US 2005/0018879 A1    Jan. 27, 2005

(30) Foreign Application Priority Data

Jul. 22, 2003    (JP)    ............... 2003-199640

(51) Int. Cl.
  *G06K 9/00*    (2006.01)
  *G06K 9/62*    (2006.01)
  *G06K 9/68*    (2006.01)

(52) U.S. Cl. ............... 382/103; 382/152; 382/155; 382/219

(58) Field of Classification Search ............... 382/103, 382/219; 348/152, 155
See application file for complete search history.

(56) References Cited

U.S. PATENT DOCUMENTS

| | | | | |
|---|---|---|---|---|
| 5,016,007 A | * | 5/1991 | Iihoshi et al. | 340/995.22 |
| 5,202,661 A | * | 4/1993 | Everett et al. | 340/522 |
| 5,943,442 A | * | 8/1999 | Tanaka et al. | 382/216 |
| 6,088,468 A | | 7/2000 | Ito et al. | |
| 6,404,455 B1 | * | 6/2002 | Ito et al. | 348/169 |
| 2002/0008758 A1 | * | 1/2002 | Broemmelsiek et al. | 348/143 |
| 2002/0041698 A1 | * | 4/2002 | Ito et al. | 382/103 |
| 2003/0103139 A1 | * | 6/2003 | Pretzer et al. | 348/143 |

FOREIGN PATENT DOCUMENTS

| | | |
|---|---|---|
| EP | 1160652 A2 | 12/2001 |
| EP | 1441529 A1 | 7/2004 |
| JP | 8163411 | 6/1996 |
| JP | 950585 | 2/1997 |
| JP | A-9-93573 | 4/1997 |
| JP | 2000125288 | 4/2000 |
| JP | A-2001-69494 | 3/2001 |
| WO | 0169930 | 9/2001 |

OTHER PUBLICATIONS

"Introduction of Computer Image Processing," pp. 149-153, 1985, published by Soken Shuppan Ltd.

* cited by examiner

*Primary Examiner*—John B Strege
(74) *Attorney, Agent, or Firm*—Brundidge & Stanger, P.C.

(57) ABSTRACT

An object tracking apparatus consisting of an imaging device, a signal processor for processing a video signal generated by the imaging device, and a display for displaying the result of processing performed by the signal processor. An intruding object is detected within a field under monitoring based on a video signal captured by the imaging device, and the imaging device is controlled in response to motions of the intruding object to track the object. The position of a visual field range of the imaging device is calculated, and panning and tilting of the imaging device and an imaging lens are controlled such that the calculated position of the visual field range of the imaging device does not include an imaging prohibited region positioned within the field under monitoring.

11 Claims, 13 Drawing Sheets

OBJECT TRACKING METHOD AND OBJECT TRACKING APPARATUS

BACKGROUND OF THE INVENTION

The present invention relates to an object tracking method and an object tracking apparatus, and more particularly, to an object tracking method and an object tracking apparatus for controlling an imaging field (visual field range) of an imaging device in accordance with motions of an object.

While remote monitoring systems relying on an imaging device such as a TV (television) camera have been conventionally used in wide applications, many of them are so-called manned monitoring systems which employ a watchman who is monitoring while viewing images displayed on a monitor. In this type of manned monitoring system, a watchman is required to watch images displayed on a monitor at all times to identify in real time an intruding object such as a human, a car or the like which can come into a field under monitoring, so that a large burden is imposed on the watchman. Since a human has limitations in concentration, the manned monitoring system experiences overlooked intruding objects, which cannot be ignored, and therefore has a problem on the reliability. Also, as monitoring cameras become increasingly widespread, a single watchman often monitors images from a number of TV cameras on a plurality of monitors. The watchman can also overlook an intruding object when a plurality of TV cameras simultaneously capture intruding objects. Therefore, in recent years, an automatic tracking monitoring system has been highly demanded for automatically detecting an intruding object through image processing of images captured by TV cameras, instead of the human-based monitoring, automatically adjusting the visual field, viewing direction, and viewing angle of the TV cameras in accordance with motions of the intruding object, and generating a predetermined report and/or alarm.

For realizing such a system, a function is required for detecting an intruding object from an image signal, and detecting motions of the intruding object in accordance with a predetermined monitoring scheme. An example of such a monitoring scheme for detecting an intruding object is a method called a "subtraction method" (see, for example, U.S. Pat. No. 6,088,468) which has been conventionally used in wide applications. The subtraction method involves comparing an input image captured by a TV camera with a previously created reference background image, i.e., an image without intruding object to calculate, for example, a difference in luminance at each pixel, and detecting a region having a large difference value as an object.

An example of monitoring scheme for detecting a moving amount of an intruding object is a method called a "template matching method" (see, for example, "Introduction of Computer Image Processing," pp149-153, 1985, published by Soken Shuppan Ltd.) which has been conventionally used in wide applications just like the subtraction method. The template matching method involves registering an image of an intruding object detected by a subtraction method or the like as a template, and detecting the position most similar to the template image in sequentially inputted images. Generally, when an object of interest is tracked using the template matching, the template is sequentially updated with an image of the object of interest at a position detected by the matching processing in order to follow a change in posture of the object of interest.

There is also a camera control system which sets a region which should not be captured by a monitor camera, and controls the direction of the monitor camera to avoid capturing the region which should not be captured by the monitor camera (see, for example, JP-A-9-93573).

Further, JP-A-2001-69494 discloses a monitor camera apparatus which comprises a monitor camera capable of panning over 360 degrees and tilting beyond 90 degrees, and a control function therefor, where the monitor camera holds data for masking a private zone included in an image, and masks part of the image in accordance with the data. This prior art monitor camera apparatus, however, does not have a function of tracking an intruding object.

SUMMARY OF THE INVENTION

The aforementioned monitoring system is disadvantageous in that the TV camera can capture private houses which are not to be monitored, and that essential facilities within a field under monitoring can be hidden in a blind zone for a long time, thus making the system more likely to overlook an intruding object.

It is an object of the present invention to provide an object tracking method and an object tracking apparatus for tracking an object in a field under monitoring.

It is another object of the present invention to provide an object tracking method and an object tracking apparatus which are capable of tracking an object, even when a field under monitoring partially includes a particular region such as a region to be excluded from monitoring, or an essential region which must be monitored without fail, in consideration of such a particular region.

According to one aspect of the present invention, a tracking method is provided for tracking an object using an imaging device configured for controlling at least one of an imaging direction and zooming. The method comprises the steps of detecting the object from the image based on an image from the imaging device, calculating a current or a predicted visual field range of the imaging device, determining whether or not the current or predicted visual field range includes an imaging prohibited region, controlling at least one of the imaging direction and zooming of the imaging device based on the detected information on the object when the current or predicted visual field range does not include an imaging prohibited region, and tracking the object.

In one embodiment, the operation of the imaging device is stopped when the calculated or current visual field range includes an imaging prohibited region.

In one embodiment, the tracking method further comprises the step of operating the imaging device in an opposite direction for a predetermined time and stopping the operation of the imaging device when the calculated or current visual field range includes an imaging prohibited region.

In one embodiment, the tracking method further comprises the step of masking an imaging prohibited region included in a captured image when the captured image of the calculated current or predicted visual field range includes the imaging prohibited region.

In one embodiment, the tracking method further comprises the step of displaying a message which indicates that operation of the imaging device is stopped because the imaging prohibited region is detected.

In one embodiment, the calculation of the predicted visual field range of the imaging device includes the steps of calculating a moving amount of the imaging device based on a positional relationship between a current position of the object and a predetermined position within the image, and calculating the predicted visual field range based on a control amount of the imaging device including the moving amount.

According to another aspect of the present invention, an object tracking apparatus comprises an imaging device, a driving mechanism coupled to the imaging device for changing the position of a visual field range of the imaging device, an image signal processor for processing an image signal from the imaging device, and a controller for controlling the driving mechanism in response to a control signal from the image signal processor, wherein the image signal processor includes means for detecting an object based on an image from the imaging device, means for calculating a current or a predicted visual field range of the imaging device, means for determining whether or not the calculated current or predicted visual field range includes an imaging prohibited region, and means responsive to the determining means for generating the control signal for controlling at least one of the imaging direction and zooming of the imaging device based on the detected information on the object when the determining means determines that the calculated current or predicted visual field range does not include an imaging prohibited region.

Other objects, features and advantages of the invention will become apparent from the following description of the embodiments of the invention taken in conjunction with the accompanying drawings.

DETAILED DESCRIPTION OF THE EMBODIMENTS

Figure 1:
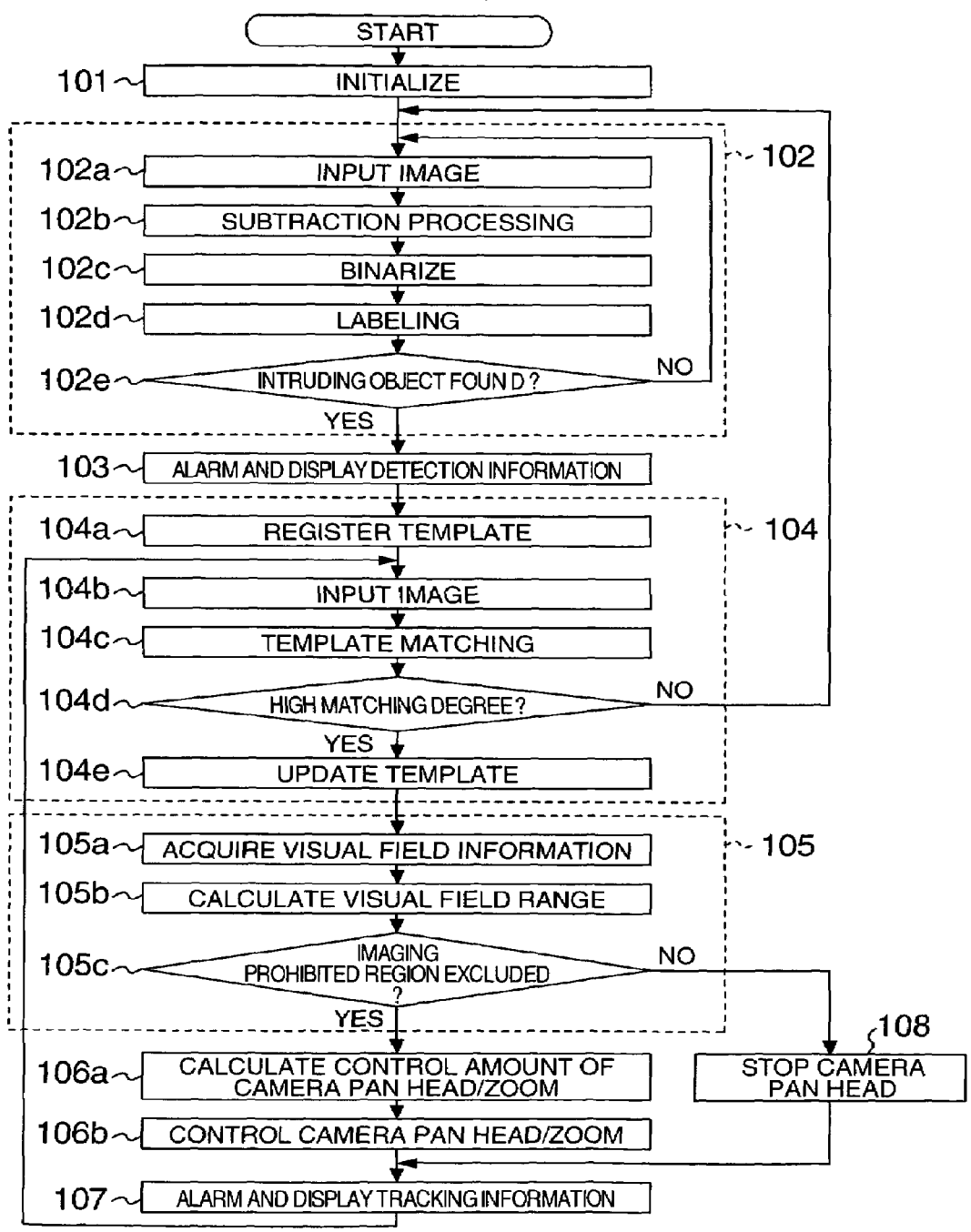
FIG. 1 is a flow chart illustrating a sequence of operations according to one embodiment of the present invention.

Several embodiments of the present invention will be described with reference to the accompanying drawings, wherein like components are designated the same reference numerals.

Figure 2:
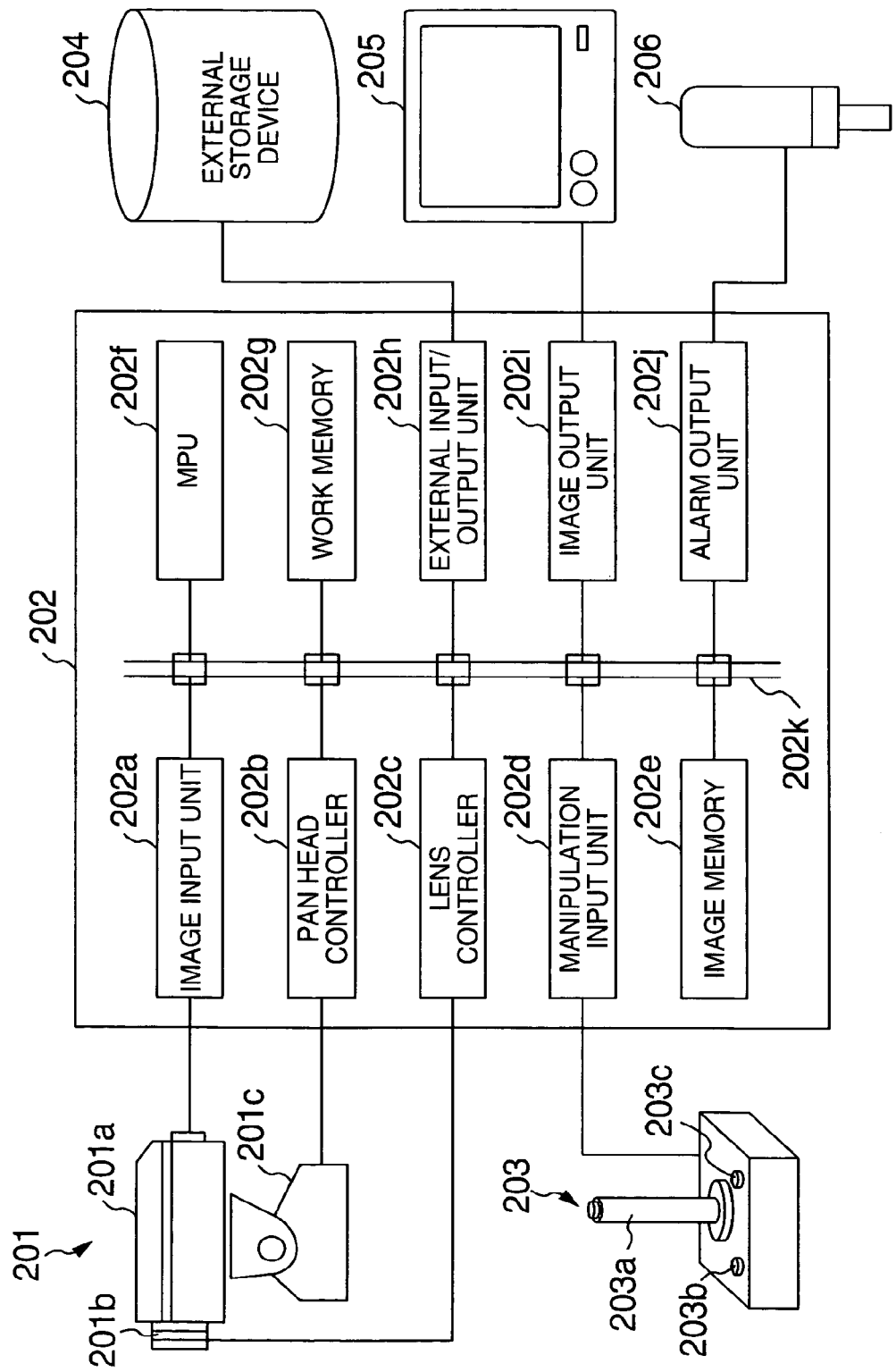
FIG. 2 is a block diagram generally illustrating the configuration of a system according to one embodiment of the present invention.

One embodiment of the present invention will be first described with reference to FIGS. 1 and 2. FIG. 2 is a block diagram illustrating the configuration of a system for embodying the present invention. The system illustrated in FIG. 2 has an imaging device 201 which is composed of a TV camera 201a, a zoom lens (imaging lens) 201b, and a camera pan and tilt head (camera driving mechanism, hereinafter referred to as camera pan head) 201c. A signal processor 202 comprises an image input unit 202a, a pan and tilt head controller (hereinafter referred to as pan head controller) 202b, a lens controller 202c, a manipulation input unit 202d, an image memory 202e, an MPU (Micro Processing Unit) 202f, a work memory 202g, an external input/output unit 202h, an image output unit 202i, an alarm output unit 202j, and a data bus 202k. A manipulation unit 203 has a joy stick 203a, a first button 203b, and a second button 203c. The system further has an external storage device 204, an image monitor 205, and an alarming device 206, for example, an alarming lamp. The output of the TV camera 201a is connected to the data bus 202k through the image input unit 202a, and a control unit of the zoom lens 201b is connected to the data bus 202k through the lens controller 202c.

The camera pan head 201c, which carries the TV camera 201a thereon, is connected to the data bus 202k through the pan head controller 202b. The output of the manipulation unit 203 is connected to the data bus 202k through the manipulation input unit 202d. The external storage device 204 in turn is connected to the data bus 202k through the external input/output unit 202h; the image monitor 205 for monitoring is connected to the data bus 202k through the image output unit 202i; and the alarming device 206 is connected to the data bus 202k through the alarm output unit 202j. The MPU 202f and work memory 202g are connected to the data bus 202k without any intervention.

The TV camera 201a has functions of capturing a field under monitoring within its visual field, imaging the field under monitoring to output a video signal, and imaging an intruding object. For this purpose, the TV camera 201a is mounted on the camera pan head 201c which can freely swing the TV camera 201a in a panning and a tilting direction. The TV camera 201a also has the zoom lens 201b, and has a function of enlarging an image. A captured video signal is stored in the image memory 202e through the data bus 202k from the image input unit 202a. The external storage device 204 works to store programs, data and the like, such that a program, data and the like are read into the work memory 202g through the external input/output unit 202h as required, and conversely, data in the work memory 202g is preserved in the external storage device 204.

Upon activation of the signal processor 202, the MPU 202f reads an appropriate program preserved in the external storage device 204 into the work memory 202g for executing necessary signal processing. Specifically, the MPU 202f analyzes images stored in the image memory 202e within the work memory 202g. Then, in accordance with the result of the processing, the MPU 202f controls the camera pan head 201c and zoom lens 201b to change the imaging field of the TV camera 201a and track an intruding object. Also, the MPU 202f displays the result of detecting an intruding object on the image monitor 205 as required, and drives the alarming device 206 to generate an alarm.

Next, the operation of the present invention, implemented in the foregoing system configuration, will be described with reference to FIG. 1. First, at an initialization step 101, the manipulation unit 203 is used to initialize external devices, variables associated with respective components, image memory, and the like in order to execute an object tracking method according to the present invention. The flow next proceeds to step 102. Step 102 involves a process for executing an object recognition based on the subtraction method.

Now, the object recognition based on the subtraction method will be described with reference to FIG. 3. At the first image input step 102a, an input image 301 is captured from the TV camera 201a. The input image 301 may have, for example, 320 pixels in the horizontal direction and 240 pixels in the vertical direction. At a subtraction processing step 102b, a subtractor 306 (shown in FIG. 3) of the MPU 202f calculates a difference value of the luminance at each pixel between the input image 301 captured at the first image input step 102a and a reference background image 302, which does not include any intruding object, previously created and recorded in the image memory 202e. At a binarizing step 102c, the pixel value (differential value) of each pixel on the differential image 303 generated at the subtraction processing step 102b is calculated, for example, in eight bits per pixel, and represented in 256 gradation levels. A pixel value lower than a predetermined threshold Th (for example, Th=20) is set to "0," and a pixel value equal to or higher than the threshold Th is set to "255" to generate a binary image 303. While the threshold Th is set to 20 in this embodiment, the threshold Th is not limited to 20 but is determined empirically in accordance with conditions under which an intruding object is detected, the state of an input image, and the like.

At a labeling step 102d, blocks of pixels having the pixel value "255" are detected in the binary image 304 generated at the binarizing step 102c, and the respective blocks are numbered for distinction from one to another. At an intruding object existence determination step 102e, it is determined that an intruding object exists within the field under monitoring if any block of pixels having the pixel value "255," numbered at the labeling step 102d, meets predetermined conditions (for example, a block has dimensions of 20 pixels or more in the horizontal direction and 50 pixels or more in the vertical direction).

In this way, a human-shaped object 309 captured in the input image 301 is calculated as an area 210 which causes a difference by the subtractor 306, so that the human-shaped object 310 remains, while the background is not displayed. Therefore, an image 311 representative of the human-shaped object 310 is detected by a binarizer 307 (shown in FIG. 3). The foregoing is the outline of the processing involved in the intruding object detection process 102 based on the subtraction method.

If it is determined at the intruding object existence determination step 102e that an intruding object exists, the flow proceeds to an alarm/detection information display step 103. At the alarm/detection information display step 103, information on the intruding object (position, the number of persons, and the like) is displayed on the image monitor 205 through the image output unit 202i for informing a watchman, for example, with a warning indicative of the detection of the intruding object, an alarm is generated from the alarming device 206 through the alarm output unit 202j, and the like. If it is determined that no intruding object exists, the flow again returns to the image input step 102a, where the subtraction method is repeated for detecting an intruding object.

Next, if it is determined at an intruding object existence determination step 102e that an intruding object exists, the flow proceeds to a template matching based intruding object tracking step 104. Here, the template matching based intruding object tracking step 104 will be described with reference to FIGS. 3 and 4. At a template registration step 104a, the image of the intruding object in the input image 301 is marked off by an extractor 308 (shown in FIG. 3) based on a circumscribed rectangle 312 (shown in FIG. 3) of the block of pixels having the pixel value "255," numbered at the labeling step 102d to generate a template image 305. The template image 305 includes a template 313 representative of the intruding object 309, and this is registered as an initial template for the template matching based intruding object tracking step 104.

Next, at a second image input step 104b, in input image having, for example, 320 pixels in the horizontal direction and 240 pixels in the vertical direction is captured from the TV camera 201a in a manner similar to the first image input step 102a. At a template matching step 104c, the image presenting the highest matching degree to the template 313 is detected from the input image captured at the second image input step 104b. Generally, a comparison of a template with an overall image takes a long calculation processing time, so that a predetermined range is defined as a search zone which may be extended from the template 313, for example, by 20 pixels for each of the upper end and lower ends of the template and 50 pixels for each of the right and left ends of the template, and the image presenting the highest matching degree to the template 313 is detected in the search zone. A normalized correlation value r(Δx, Δy) can be applied to the matching degree, as expressed by Equation 1:

$$r(\Delta x, \Delta y) = \frac{\sum_{i,j \in D}(f(x_0 + \Delta x + i, y_0 + \Delta y + j) - \overline{f(x_0 + \Delta x, y_0 + \Delta y)}) \cdot (g(x_0 + i, y_0 + j) - \overline{g(x_0, y_0)})}{\sqrt{\sum_{i,j \in D}(f(x_0 + \Delta x + i, y_0 + \Delta y + j) - \overline{f(x_0 + \Delta x, y_0 + \Delta y)})^2} \sqrt{\sum_{i,j \in D}(g(x_0 + i, y_0 + j) - \overline{g(x_0, y_0)})^2}} \quad \text{Eq. 1}$$

where $$\overline{f(x_0 + \Delta x, y_0 + \Delta y)} = \frac{1}{|D|}\sum_{i,j \in D} f(x_0 + \Delta x + i, y_0 + \Delta y + j)$$

$$\overline{g(x_0, y_0)} = \frac{1}{|D|}\sum_{i,j \in D} f(x_0 + i, y_0 + j)$$

f(x, y) represents the input image, and g(x, y) represents the template image. $(x_0, y_0)$ represents the coordinates at the upper left corner of the template 313 (401a in FIG. 4). The image 401 has a coordinate system which defines the origin (0, 0) at the upper left corner of the image 401. D represents the size of the template 313 (401a), for example, the size of the circumscribed rectangle 312 associated with the intruding object detected on the digitized image 304, and represents, for example, an area of 20 pixels in the horizontal direction and 50 pixels in the vertical direction. The normalized correlation value r(Δx, Δy) takes a value which satisfies −1≦r(Δx, Δy)≦1, and takes "1" when an input image completely matches a template. The template matching refers to processing for detecting the position (Δx, Δy) at which the normalized correlation value r(Δx, Δy) is maximized when Δx, Δy are scanned within the search zone, i.e., varied in the ranges of −50≦Δx≦50, and −20≦Δy≦20, respectively, in the foregoing case.

Next, at a matching degree determination step 104*d*, the matching degree r(Δx, Δy) is determined. When the normalized correlation value expressed by Equation 1 is used, a matching degree equal to or higher than 0.7, for example, is determined to be high, causing the flow to proceed to a template update step 104*e*. If the matching degree is lower than 0.7, the flow returns to the first image input step 102*a* to repeat the foregoing processing. A high matching degree means that an image similar to the template 313 is detected in the second input image, i.e., an intruding object exists within the field under monitoring at a position offset by (Δx, Δy) relative to the position of the template 313. In this event, the moving amount of the intruding object is detected subsequent to the detection. A low matching degree means that there is no image similar to the template 313 in the second input image, i.e., no intruding object exists within the field under monitoring, in which case the flow returns to the first image input step 102*a* to repeat the foregoing processing. It should be understood that though the normalized correlation value has been described to be 0.7, the normalized correlation value is not limited to this value but is set on an empirical basis.

Next, at the template update step 104*e*, the image of the intruding object is marked off from the input image captured at the second image input step 104*b* based on the position of the newly found intruding object, and is defined to be a new template image. By thus updating the template in sequence, the image of the latest intruding object is recorded in the template. Also, even if the intruding object moves or changes in posture, the moving amount of the intruding object can be detected in a stable manner, thereby readily tracking the intruding object.

Now, an intruding object moving amount detection process will be described in greater detail with reference to FIGS. 3 and 4.

Figure 3:
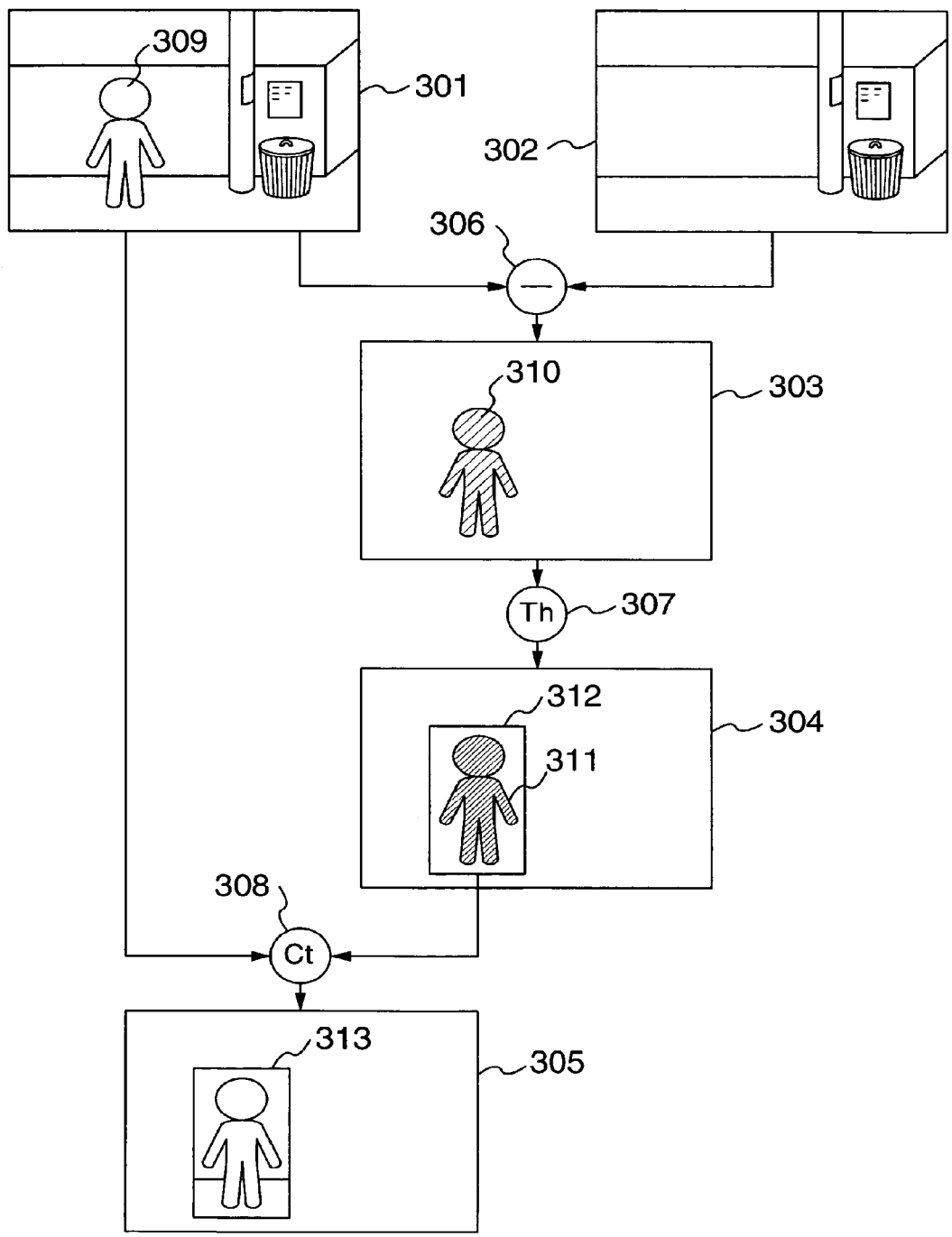
FIG. 3 is a diagram for explaining the basic principles of a subtraction method employed in the present invention.
Figure 4:
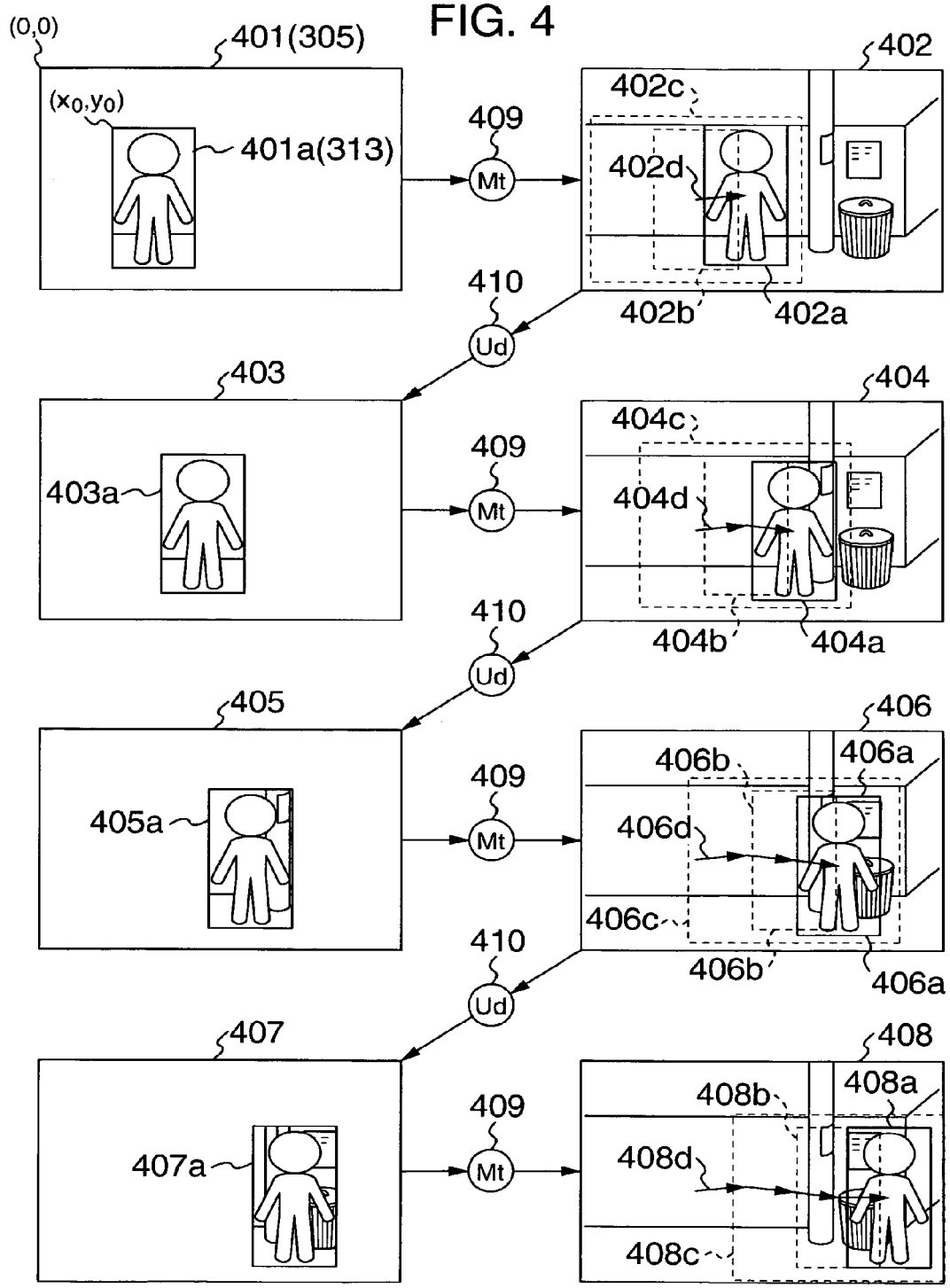
FIG. 4 is a diagram for explaining the basic principles of a template matching method employed in the present invention.

In FIG. 3, an intruding object 309 existing in an input image 301 is detected as a cluster of pixels having the pixel value "255" within a binary image at the labeling step 102*d*. The intruding object 311 is marked off by the extractor 308 based on a circumscribed rectangular thereof to create a template image 305. The template image 305 includes the template 313 of the intruding object 309 which is used as an initial template in the template matching based intruding object tracking process.

Next, the template matching is performed based on the initial template 313. FIG. 4 illustrates the flow of the template matching based intruding object tracking process for tracking the intruding object. A template image 401 includes a template 401*a*. Here, parenthesized reference numerals 305, 313 are the same as the number given to the template image 305 and template 313, respectively, shown in FIG. 3. In FIG. 4, the time at which the template image 401 is captured is represented by t0. Subsequently, in a similar manner, input images 402, 404, 406 sequentially inputted at predetermined time intervals (for example 100 ms) are captured at t0+1, t0+2, t0+3, . . . , respectively, in the order in which they are inputted. The image 401 represents a template image at time t0, while the image 401*a* represents a template at time t0. The image 402 in turn represents an input image at time t0+1, a rectangular area 402*b* in the image 402 indicates the position of the intruding object at time t0 (position of the template 401*a*), and a rectangular area 402*c* indicates an area (search zone) subjected to the template matching.

Here, as the template matching process 409 (template matching step 104*c*) is executed, the matching degree is maximized in the image 402*a* which most matches the template 401*a* in the search zone 402*c* of the template matching, thus revealing that the intruding object is present at the position of the image 402*a* at time t0+1. In other words, it is understood that the intruding object has moved by a distance represented by an arrow 402*d* (by a moving amount (Δx, Δy)).

Next, in the template update process 410 (template update step 104*e*), the image 402*a* which most matches the template 401*a* is used to update the previous template 401*a* is updated to a new template at time t0+1. Specifically, the area 402*a* of the intruding object is marked off from the input image 402, and is defined as a template image 403, and the image 402*a* of the intruding object is used to update the template 401*a* to a new template 403*a* at time t0+1. As this series of processing is executed sequentially for input images sequentially captured by the TV camera, a search zone 404*c* is set within an input image 404 at time t0+2 based on the area 404*b* of the template 403*a* in a manner similar to the foregoing, and the area 404*a* of the intruding object is detected by the template matching process 409 using the template 403*a* within the template image 403 at time t0+1. As a result, it is understood that the intruding object has moved as indicated by an arrow 404*d*. Further, through the template update process 410, the template image 403 and template 403*a* at time t0+1 are updated respectively to a template image 405 and a template 405*a* of the intruding object at time t0+2.

Further, a search zone 406*c* is set within an input image 406 at time t0+3 based on the area 406*b* of the template 405*a*, and the area 406*a* of the intruding object is detected using the template 405*a* within the template image 405 at time t0+2 through the template matching process 409. As a result, it is understood that the intruding object has moved as indicated by an arrow 406*d*. Further, through the template updating process 410, the template image 405 and template 405*a* at time t0+2 are updated respectively to a template image 407 and a template 407*a* of the intruding object at time t0+3. A search zone 408*c* is set within an input image 408 at time t0+4 based on the area 408*b* of the template 407*a*, and the area 408*a* of the intruding object is detected using the template 407*a* within the template image 407 at time t0+3 through the template matching process 409. As a result, it is understood that the intruding object has moved as indicated by an arrow 408*d*. In other words, the intruding object can be tracked by sequentially executing the template matching.

Prior to description on the next visual field range determination step 105, problems to be solved by this embodiment will be described below in greater detail.

In recent years, the incease of monitoring cameras cause a problem of infringing the privacy of general residents. Since the template matching based object tracking method described above operates to automatically control the camera pan head 201*c* in response to a movement of an intruding object to capture the intruding object within the visual field of the TV camera 201*a*, private houses not subjected to monitoring, a privacy sensitive place, and the like, if any, would be also captured within the visual field of the TV camera 201*a* unless the object tracking method is brought into practice without any limitations. When private houses not subjected to monitoring, and a privacy sensitive place are excluded from the visual field of the TV camera 201*a*, the camera pan head 201c must be controlled in response to motions of an intruding object to track the intruding object without fail. For this purpose, in the present invention, the visual field of the TV camera 201a is controlled to avoid capturing private houses not subjected to monitoring and a privacy sensitive place, but to track an intruding object without fail in response to motions of the intruding object. In the following, this feature will be described in greater detail.

As an intruding object is detected at the intruding object tracking step 104 based on the template matching method, the camera pan head 201c is controlled in response to motions of the aforementioned template at a camera pan head control step 106 to track the object. In this event, a visual field range determination step 105 is executed for preventing the TV camera 201a from capturing private houses not subjected to monitoring and a privacy sensitive place into the visual field range. Before describing the visual field range determination step 105, a camera pan head/zoom control amount calculation step 106a and a camera pan head/zoom control step 106b will be described with reference to FIG. 5 as to how the camera pan head 201c can track an intruding object without fail in response to motions of the intruding object.

Figure 5:
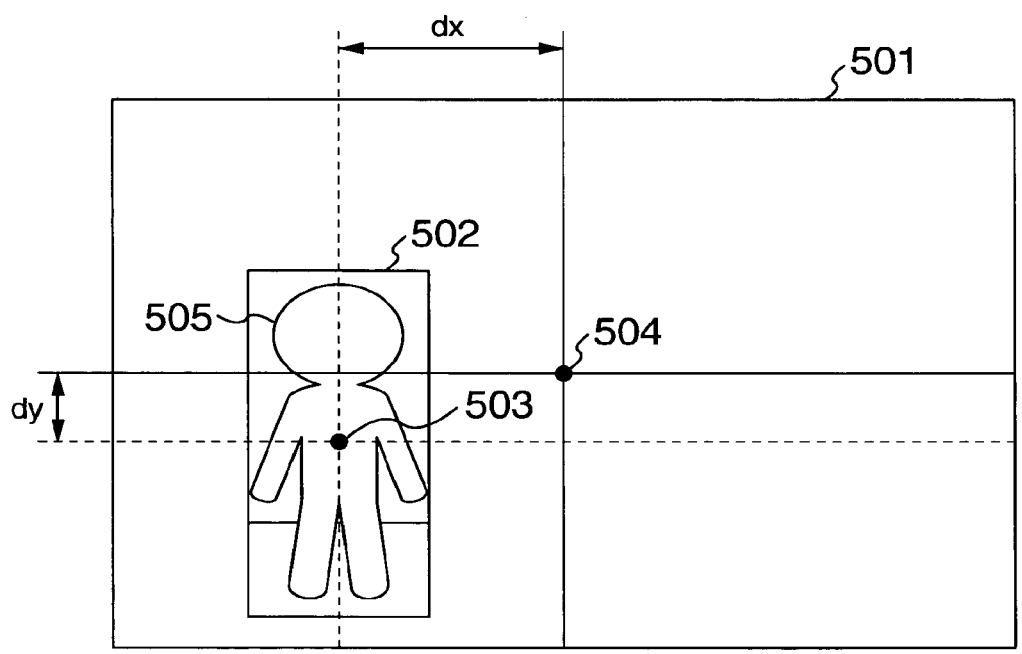
FIG. 5 is a diagram showing how a TV camera is controlled in accordance with the present invention.

In FIG. 5, assume that an intruding object 505 is detected at a position as indicated by a template 502 in a template image 501. In this event, assuming that the center of the intruding object 505 is defined as the center 503 of the template, displacements dx, dy of the center 503 from the center 504 of the template image 501 are calculated.

Here, if the center 503 of the template 502 is found to the left of the center 504 of the template image 501 (corresponding to an input image) by more than a predetermined amount S (when an intruding object exists near the center of the image, it is not necessary to control the camera pan head 201c, so that a position at which the camera pan head control is started can be specified by the predetermined amount S. For example, S=50 pixels) (dx<-S), the camera pan head 201c is panned to the left. Conversely, if the center 503 of the template 502 is to the right of the center 504 of the template image 501 by more than the amount S (dx>S), the camera pan head 201c is panned to the right. If the center 503 of the template 502 is above the center 504 of the input image (dy<-S), the camera pan head 201c is tilted upward, and if below the center 504 (dy>S), the camera pan head 201c is tilted downward. Further, an amount of change in the focal length of the zoom lens (imaging lens) 201b may be acquired for changing the zooming of the TV camera 201a depending upon the size of the updated template, namely, the size of the detected intruding object on the screen. For example, when the height of the template is equal to or less than a predetermined value, the imaging lens 201b is zoomed in and, when larger than the predetermined value, it is zoomed out. The predetermined value may be for example 400 pixels assuming that the input image has the size of 640 pixels (width)×480 pixels (height). In this case, when for example the height of the current template is 300 pixels and the focal length of the current imaging lens 201b stored on the work memory 202 g is f=30 mm, the focal length f of the imaging lens 201b may be set to 40 mm (=30×400/300) in order to make the height of the template 400 pixels. Accordingly, the MPU 202f controls the focal length of the imaging lens 201b to be 40 mm through the lens controller 202c. In this way, the intruding object can be captured in an appropriate size within the visual field of the TV camera 201a. It is a matter of course that the change of the zooming is not limited to this, but may be made based on arbitrary criterion and arbitrary manner. For example, the zooming may be changed only when the height of the template is outside a preset range. Alternatively, the imaging lens 201b may be controlled by such a simplified process that the focal length is lengthened in an increment of 1.0 mm as a zooming-in operation and it is shortened in a decrement of 1.0 mm as a zooming-out operation. The tracking processing for the intruding object is sequentially and repeatedly executed. With such simplified processing, therefore, even if a sufficient control of the focal length has not been attained, similar processing will be executed again in the next processing frame. Thus, by repeatedly executing the intruding tracking processing, the focal length of the imaging lens 201b can be controlled to become an appropriate value so that the height of the template may attain a predetermined value. Note here that the increment/decrement amount of 1.0 mm is an empirically determined value. When the value of the amount is large, the predetermined height of the template can be attained quickly with the possibility of generating an oscillation phenomenon in the focal length in the vicinity of the appropriate focal length value (over damping). Conversely, when the amount of increment/decrement in the focal length is small, it may take a long time for the template height to attain the predetermined value (under dumping). The amount of the increment/decrement in the focal length may be stored on the work memory 202g in advance. Note that the zooming may be realized by other methods than changing the focal length of the imaging lens 201b, such as executing an electronic image-enlargement on the input image obtained from the TV camera 201a.

Specifically, at the camera pan head/zoom control amount calculation step 106a, the displacements dx, dy are calculated, and control amounts are also calculated for panning or tilting the camera pan head 201c (moving amount of the camera pan head 201c) and for zooming (the forcal distance of the imaging lens 201b). Then, at the camera pan head/zoom control step 106b, the camera pan head and the imaging lens are controlled based on the calculated control amounts. Alternatively, the control velocity for a panning motor and a tilting motor may be varied by absolute values of dx, dy (the control velocity is increased as the absolute value of dx or dy is larger).

In this embodiment, "tracking" refers to following an intruding object with a controlled camera pan head. By doing so, the camera pan head 201c can be automatically controlled, while capturing an intruding object within the visual field of the TV camera 201a to track the intruding object.

Next, description will be made on the visual field range determination step 105. First, at a visual field information acquisition step 105a, the current direction of the camera pan head 201c (indicated by a panning angle $\theta_P$ and a tilting angle $\theta_T$, where the origin is defined on the front of the camera pan head) is acquired through the pan head controller 202b, and a current focal length f of the imaging lens 201b is acquired through the lens controller 202c.

Figure 6:
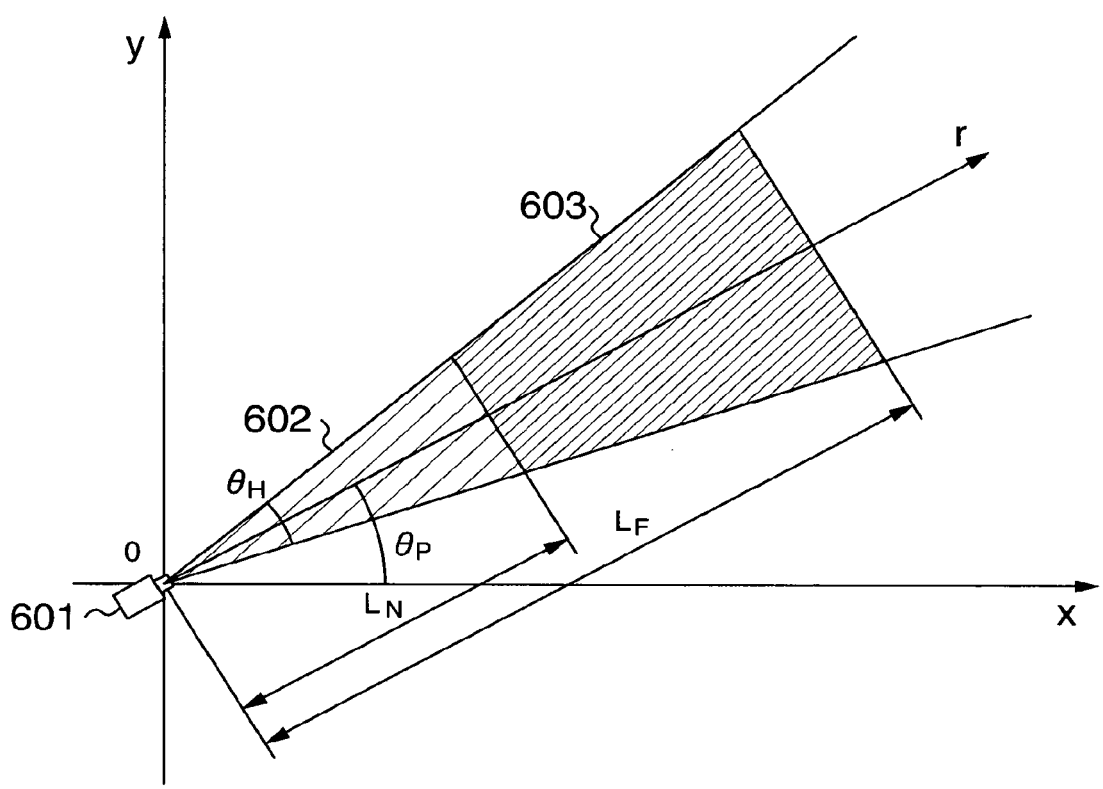
FIG. 6 is a diagram showing how an imaging range is determined in a panning direction for the TV camera in accordance with the present invention.

At a visual field range calculation step 105b, the position of an imaging range is calculated based on the current direction $\theta_P$, $\theta_T$ of the camera pan head 201c, and the current focal length f of the imaging lens 201b acquired at the visual field information acquisition step 105a. Here, a method of calculating the position of the imaging range will be described with reference to FIGS. 6 and 7. For simplicity, assume that a field under monitoring is plane and does not include any ragged ground. FIG. 6 is a plane view taken from directly above a TV camera 601 at which the origin of coordinates is defined. Using this figure, the angle of view $\theta_H$ (the viewing angle of the camera in the lateral direction) can be calculated by Equation 2

$$\theta_H = 2 \times \tan\frac{w}{2 \times f} \quad \text{Eq. 2}$$

where w represents the width of an imaging device of the TV camera 601, for example, a CCD (Charge Coupled Device), and w=4.8 mm when a ⅓-inch imaging device (device size: 4.8 mm×3.6 mm) is used. When a ⅓-inch imaging device is used with the focal length of an imaging lens set at f=8.0 mm, the TV camera 601 has the angle of view $\theta_H$ equal to 33.4°. In other words, the visual field of the TV camera 601 has a range of 33.4° in the horizontal direction. The TV camera 601 is installed in most cases at a position higher than a field under monitoring, so that the TV camera 601 cannot capture a region beneath itself in accordance with the current direction $\theta_T$ of the camera pan head 102c. This region appears in a range of the line of sight $L_N$ from the TV camera 601 (indicated by an area 602). The remaining area 603 (area indicated by $L_F$-$L_N$) does appear within the visual field of the TV camera 601 without fail.

Figure 7:
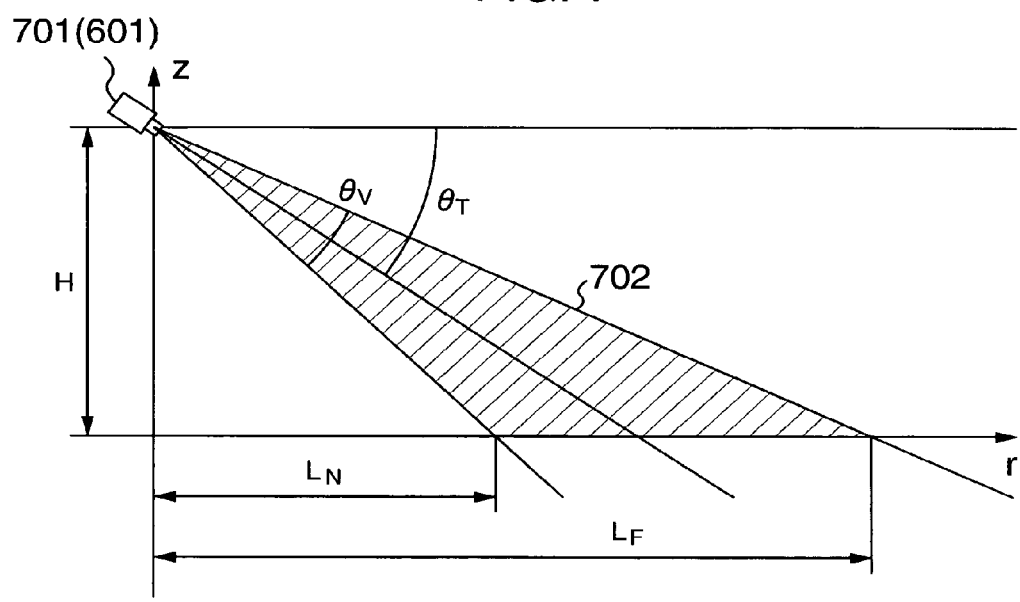
FIG. 7 is a diagram showing how an imaging range is determined in a tilting direction for the TV camera in accordance with the present invention.

The distances $L_N$, $L_F$ will be described with reference to FIG. 7. FIG. 7 is a diagram showing a TV camera 701 (identical to the TV camera 601) viewed from one side, where the line of sight direction of the TV camera is defined to be the horizontal axis. As is the case with Equation 2, the angle of view $\theta_V$ (viewing angle of the camera in the vertical direction) of the TV camera 701 is calculated by Equation 3:

$$\theta_V = 2 \times \tan\frac{h}{2 \times f} \quad \text{Eq. 3}$$

where h represents the height of an imaging device of the TV camera 701, for example, a CCD device, and h=3.6 mm when a ⅓ inch imaging device, for example, is used. When an ⅓ inch imaging device is used with the focal length of an imaging lens set at f=8.0 mm, similar to the aforementioned conditions, the TV camera 701 has the angle of view $\theta_V$ equal to 25.4°. In other words, the visual field of the TV camera 701 has a range of 25.4° in the vertical direction. Here, assuming that the TV camera 701 is installed at a height H, $L_N$, $L_F$ can be calculated by Equations 4:

$$L_N = H \times \tan\left(90° - \theta_T - \frac{\theta_V}{2}\right) \quad \text{Eqs. 4}$$

$$L_F = H \times \tan\left(90° - \theta_T + \frac{\theta_V}{2}\right)$$

As a result of the foregoing calculations, a range which can be imaged by the TV camera 601 (701) extends over an area 603 shown in FIG. 6 and an area 702 shown in FIG. 7. With a ⅓ inch imaging device, when the focal length f of the imaging lens is set at 8.0 mm (f=8.00); the camera pan head 201c is currently directed at $\theta_T$ of 30°; and the TV camera 701 is installed at a height of 5.0 m (H=5.0), under similar conditions to the foregoing, $L_N$=5.42 m and $L_F$=16.1 m are found from Equations 4.

Next, at an imaging prohibited region exclusion determination step 105c, when the visual field range of the TV camera 201a (shaded areas 603, 702 in FIGS. 6, 7, respectively) calculated at the visual field range calculation step 105b does not include any region other than the field under monitoring (imaging prohibited region), the flow proceeds to the camera pan head control amount calculation step 106a. On the other hand, the flow proceeds to a camera pan head stopping step 108 when the visual field of the TV camera 201a includes an imaging prohibited region.

Figure 8:
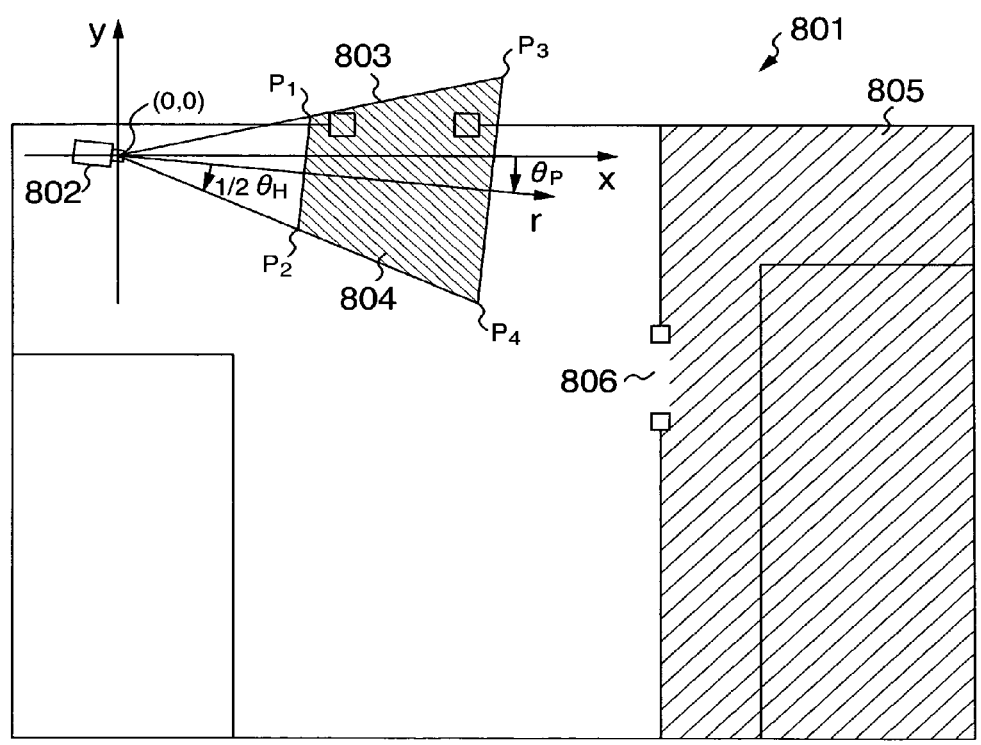
FIG. 8 is an explanatory diagram showing the relationship between an imaging range of the TV camera and a monitor map in the present invention.
Figure 9:
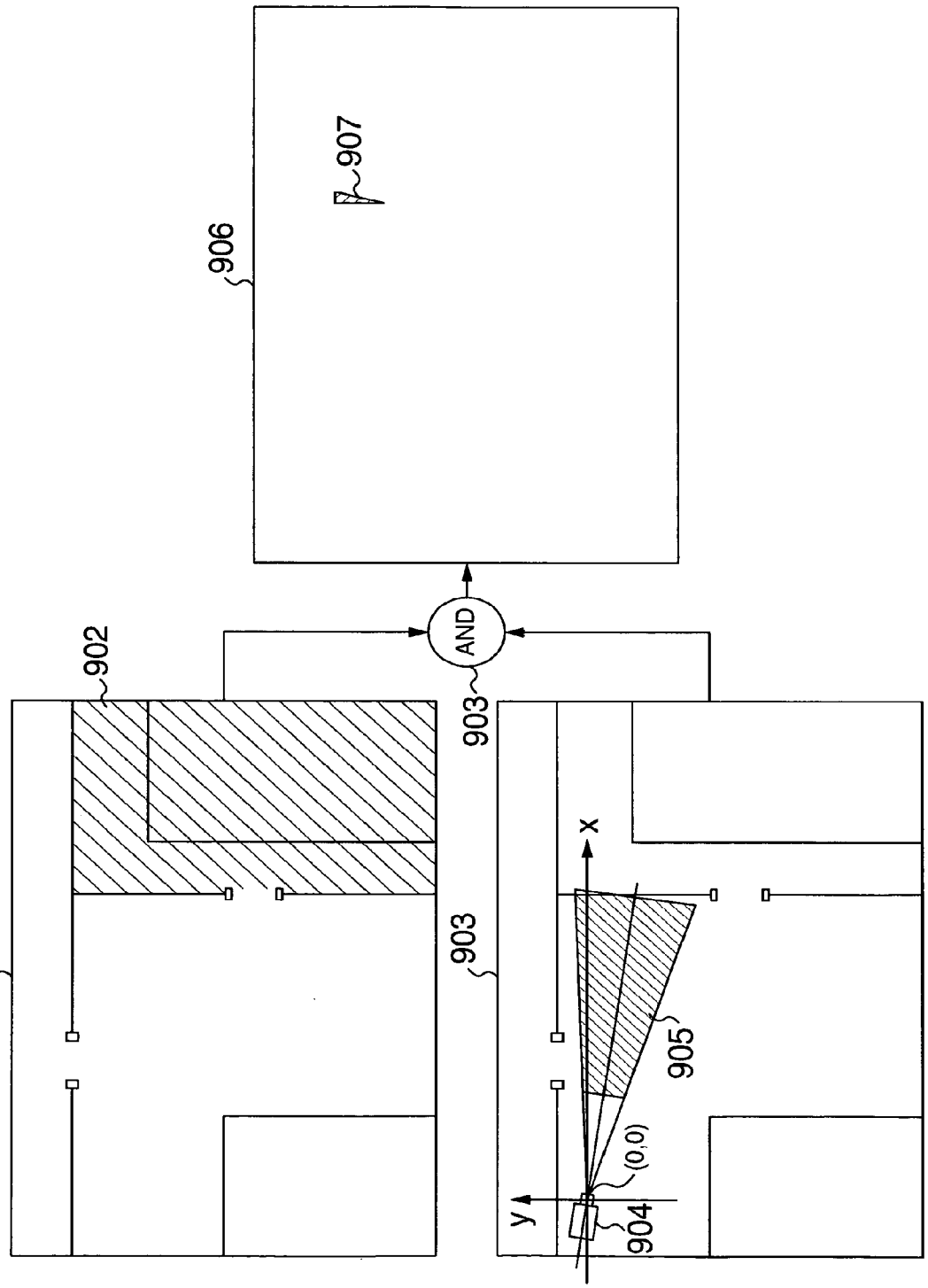
FIG. 9 is a diagram showing how the TV camera is controlled to avoid capturing an imaging prohibited region within the imaging range in accordance with the present invention.

Now, the determination made at the imaging prohibited region exclusion determination step 105c will be described with reference to FIGS. 8 and 9. FIG. 8 is, for example, called a monitor map 801 which represents information on structures within a field under monitoring by such means as map information (or vector information). A TV camera 802, visual field range 803, essential monitor point 804, and imaging prohibited region 805 are superimposed on the monitor map 801. The map information on the monitor map 801 may be converted, for example, into (x, y) coordinates on x-, y-coordinate axes, and stored in the image memory 202e of the monitoring system in the form of a memory table (or may be stored in the external storage device 204). The imaging prohibited region 805 includes, for example, private houses adjacent to the field under monitoring, a place subjected to privacy protection, so that the region 805 should not be imaged by the TV camera 802. However, the field under monitoring includes immediately in front of a gate 806.

On the other hand, since the position of the visual field range 803 of the TV camera 802 is calculated by Equations 2-4 as described in connection with visual field range calculation step 105b, the position of the visual field range 803 is converted into (x, y) coordinates on the monitor map 801 based on the result of the calculation. Specifically, each position within the visual field range 803 (indicated by shading) shown in FIG. 8 is converted into x- and y-coordinates. For example, respective corners P1, P2, P3, P4 of the visual field range 803, represented by P1=($x_1$, $y_1$), P2=($x_2$, $y_2$), P3=($x_3$, $y_3$), and P4=($x_4$, $y_4$), can be calculated by Equations 5:

$$x_1 = L_N\cos\theta_P + L_N\tan\frac{\theta_H}{2}\sin\theta_P \quad \text{Eqs. 5}$$

$$y_1 = -L_N\sin\theta_P + L_N\tan\frac{\theta_H}{2}\cos\theta_P$$

$$x_2 = L_N\cos\theta_P - L_N\tan\frac{\theta_H}{2}\sin\theta_P$$

$$y_2 = -L_N\sin\theta_P - L_N\tan\frac{\theta_H}{2}\cos\theta_P$$

$$x_3 = L_F\cos\theta_P + L_F\tan\frac{\theta_H}{2}\sin\theta_P$$

$$y_3 = -L_F\sin\theta_P + L_F\tan\frac{\theta_H}{2}\cos\theta_P$$

$$x_4 = L_F\cos\theta_P - L_F\tan\frac{\theta_H}{2}\sin\theta_P$$

$$y_4 = -L_F\sin\theta_P - L_F\tan\frac{\theta_H}{2}\cos\theta_P$$

where $\theta_P$, which represents a panning angle of the TV camera 802, indicates here the angle formed by the x-axis and the optical axis of the TV camera 802. As the respective x-, y-coordinates are calculated within the visual field range 803 in a similar manner, the position of the visual field range 803 of the TV camera 802 can be converted into the x-, y-coordinate system. It should be understood that the coordinates representative of the position of the visual field range 803 changes in response to panning and tilting of the TV camera 802 and zooming of the associated imaging lens.

Next, a control method for avoiding the capture of the imaging prohibited region 805 within the visual field range 803 of the TV camera 802, as mentioned above, will be described with reference to FIG. 9. In FIG. 9, a monitor map 901, similar to the monitor map 801 is stored in the image memory 202e, for example, in the form of x-, y-coordinate positions. An imaging prohibited region is indicated by shading 902. An image 903 on a memory (hereinafter called the "visual field range image 903") represents a TV camera 904 (identical to the TV camera 802) and a visual field range 905 of the TV camera 904, the positions of which are found through calculations. Similar to the monitor map 901, the image 903 schematically represents that the TV camera 904 and its visual field range 905 stored in the form of x-, y-coordinate positions. The origin (0, 0) of the x-y coordinate system is defined at the front end of the lens mounted to the TV camera 904. Next, the monitor map 901 and visual field range image 903 are read from the image memory 202e, and processed (ANDed) 903 by the MPU 292f. Specifically, a logical AND operation is performed between the imaging prohibited region 902 and visual field range 905 on a pixel-by-pixel basis over the whole screen of the monitor map 901 to generate a processed image indicated by 906. As a result, if the imaging prohibited region 902 is included in the visual field range 905 of the TV camera 904, an imaging prohibited region fragment 907 is displayed. In other words, the detection of the imaging prohibited region fragment 907 means that part of the imaging prohibited region 902 is captured in the visual field range 905. In this event, the MPU 202f stops the operation of the panning motor and tilting motor associated with the camera pan head 201c through the pan head controller 202b (camera pan head stopping step 108). Similarly, in step 108 the control of the imaging lens 201b is stopped. By doing so, it is possible to suppress part of the imaging prohibited region 902 included in the visual field range 905. Thus, the TV camera 904 can be controlled in its panning, tilting and zooming operations to exclude the imaging prohibited region 902 from the visual field range 905.

In this way, the camera pan head stopping step 108 involves stopping the operation of the panning motor and tilting motor associated with the camera pan head 201c when the visual field range 905 of the TV camera 201a includes a region other than the field under monitoring (imaging prohibited region 907), and may additionally include a masking process for masking any imaging prohibited region fragment 907 unintentionally captured in the visual field range 905 for exclusion from a resulting image.

In the foregoing description, the operation of the panning motor and tilting motor associated with the camera pan head 201c is stopped in response to detection of the imaging prohibited region fragment 907. Alternatively, when the imaging prohibited region fragment 907 is detected, the panning motor and tilting motor associated with the camera pan head 201c may be controlled to rotate in the reverse directions, and then stop after the lapse of a predetermined time (for example, one control cycle, for example, 100 mS). Here, in controlling the panning motor and tilting motor in the reverse directions, when the camera pan head 201c is controlled to direct the TV camera in an upper right direction at the camera pan head control step 106b in the previous frame, the camera pan head 201c is controlled to direct the TV camera in the reverse direction, namely, in the lower left direction. By doing so, the imaging prohibited region 902 can be excluded from the visual field range 905 without fail. Further, when the imaging prohibited region fragment 907 is detected, the camera pan head stopping step 108 may include displaying a message on the monitor 205 for notifying that the camera pan head control is stopped because the imaging prohibited region fragment 907 has been detected, in addition to stopping the camera pan head.

Figure 13:
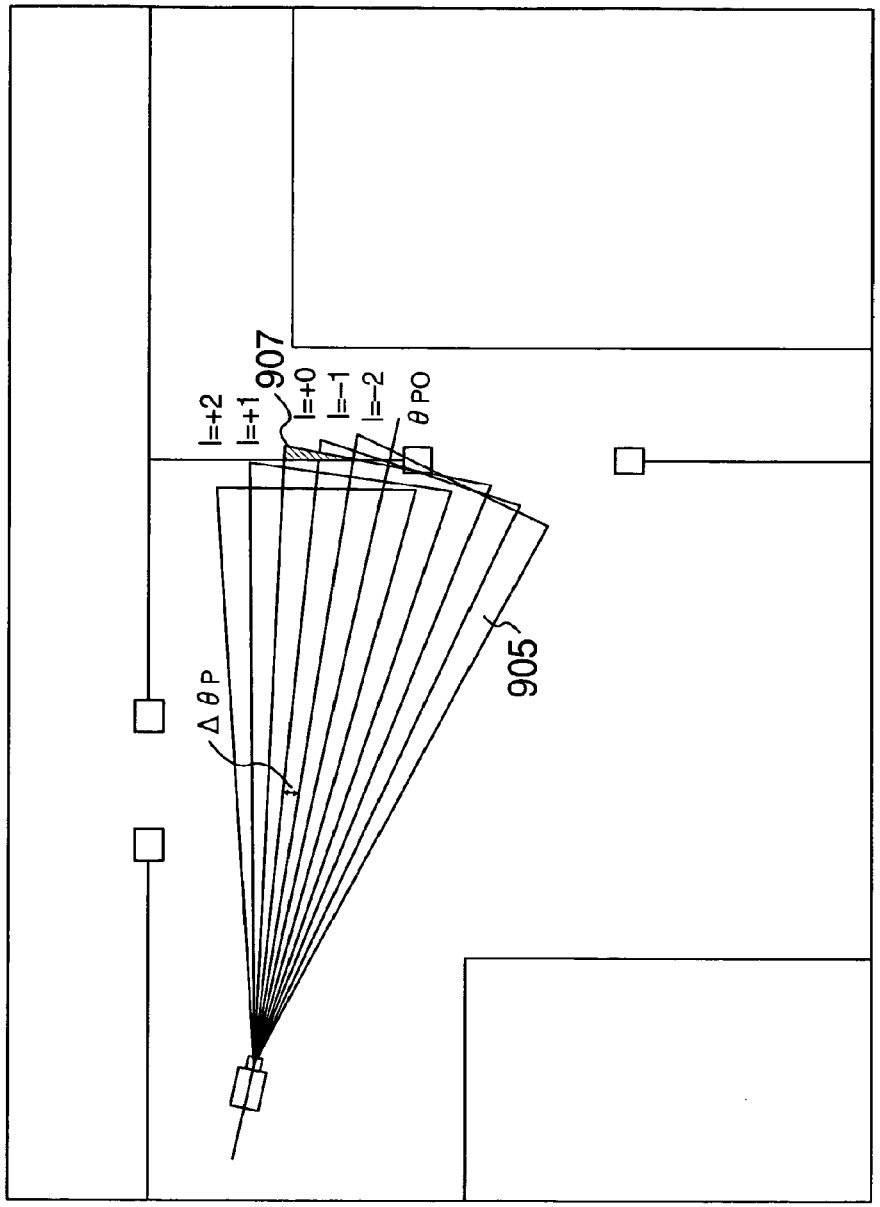
FIG. 13 is a diagram for explaining an alternative way of controlling the TV camera to avoid capturing an imaging prohibited region in accordance with the present invention.

As a further alternative, when the imaging prohibited region fragment 907 is detected, it becomes possible to prevent the imaging prohibited region fragment from being detected any longer by controlling the camera pan head 201c and imaging lens (zooming lens) 201b. This method will now be described with reference to FIG. 13.

In this method, denoting the pan angle, tilt angle and focal length of the imaging lens as $\theta_{P0}$, $\theta_{T0}$ and f0, respectively, Equations 2-5 are applied to the following $\theta_P$, $\theta_T$ and f0 to obtain respective corners P1, P2, P3 and P4 of the visual field range 905 in order to determine whether or not the visual field range 905 overlaps the imaging prohibited region 902.

$$\theta_P = \theta_{P0} + l\Delta\theta_P$$

$$\theta_T = \theta_{T0} + m\Delta\theta_T$$

$$f = f0 + n\Delta f$$

Here, $\Delta\theta_P$, $\Delta\theta_T$ and $\Delta\theta f$ are minimum increment/decrement of pan angle, tilt angle and focal length of the zoom lens, respectively, which are for example, 1 degree, 0.5 degree and 1 mm, respectively. In order to prevent the imaging prohibited area fragment from being included in the visual field range 905, l, m and n are changed in the range of $-10 \leq l \leq 10$, $-10 \leq m \leq 10$, $-10 \leq n \leq 10$, respectively, to find a combination of l, m and n that provides no overlapping of the view field range 905 and imaging prohibited area 902. By controlling the camera pan head 201c and zoom lens 201b in accordance with the then $\theta_P$, $\theta_T$ and f, it becomes becomes possible to prevent the imaging prohibited region fragment 907 from being included in the view field range 905. These processing is executed by the MPU 202f. As a simplified alternative method thereof is to simply make the focal length of the zoom lens 201b longer by a predetermined distance to thereby narrow the view field range 905 when the imaging prohibited region fragment 907 is detected.

The camera pan head control step 106b is followed by execution of an alarm/tracking information display step 107. Since details on step 107 is similar to step 103 previously described above, description thereon is omitted.

The alarm/tracking information display step 107 is also executed subsequent to the camera pan head stopping step 108 when NO is determined at imaging prohibited region exclusion determination step 105c.

According to the monitoring system of the foregoing embodiment, as described in detail with reference to FIG. 5, when an intruding object is detected, the intruding object is tracked at the intruding object tracking step 104 based on the template matching method, where the intruding object can be tracked by controlling the camera pan head 201c in response to motions of the template. Therefore, with the use of this object tracking method, when an object, for example, intruding from the gate 804, moves to the gate 806, the position of the visual field range 803 of the TV camera 802 shown in FIG. 8 can be moved in response to the moving object immediately before the moving object enters the gate 806. However, a movement of the position of the visual field range 803 can be limited by controlling the panning, tilting and zooming operations of the TV camera 802 such that the imaging prohibited region 805 is not included in the visual field range 803, thereby providing an extremely exact object tracking method. It should be noted that the template image 501 shown in FIG. 5 is rectangular whereas the visual field range 803 is in the shape of trapezoid. This is because the visual field of the TV camera 802 is projected onto the monitor map 801 vertically from above in FIG. 8. Since the template image 501 is created by marking off part of the visual field range 803, the difference in shape will not particularly cause problems.

Further, in the embodiment described above, when the imaging prohibited region 805 is partially included in the visual field range 803, the TV camera 904 is controlled in its panning, tilting and zooming operations to exclude the imaging prohibited region 902 from the visual field range 905. However, an overlapping area of the visual field range 803 of the TV camera 904 with the imaging prohibited region 902 also depends on the nature of the imaging prohibited region 902, so that the imaging prohibited region 902 is empirically determined as appropriate upon installation of the monitoring system. When the monitoring of an intruding object causes the visual field range 803 to overlap with part of the imaging prohibited region 902 as described above, the overlapping portion of the visual field range 803 with the imaging prohibited region 902 may be masked, for example, by a known masking technique, such that information on the imaging prohibited region can be readily prevented from appearing in an image captured by the TV camera 904.

Next, an object tracking method according to another embodiment of the present invention will be described with reference to FIG. 10. In the embodiment of FIG. 1, the camera pan head control amount calculation step 106a is placed behind the visual field range determination step 105, whereas in a flow chart of FIG. 10, the camera pan head control amount calculation step 106a is placed between the intruding object tracking step 104 and visual field range determination step 105.

Figure 10:
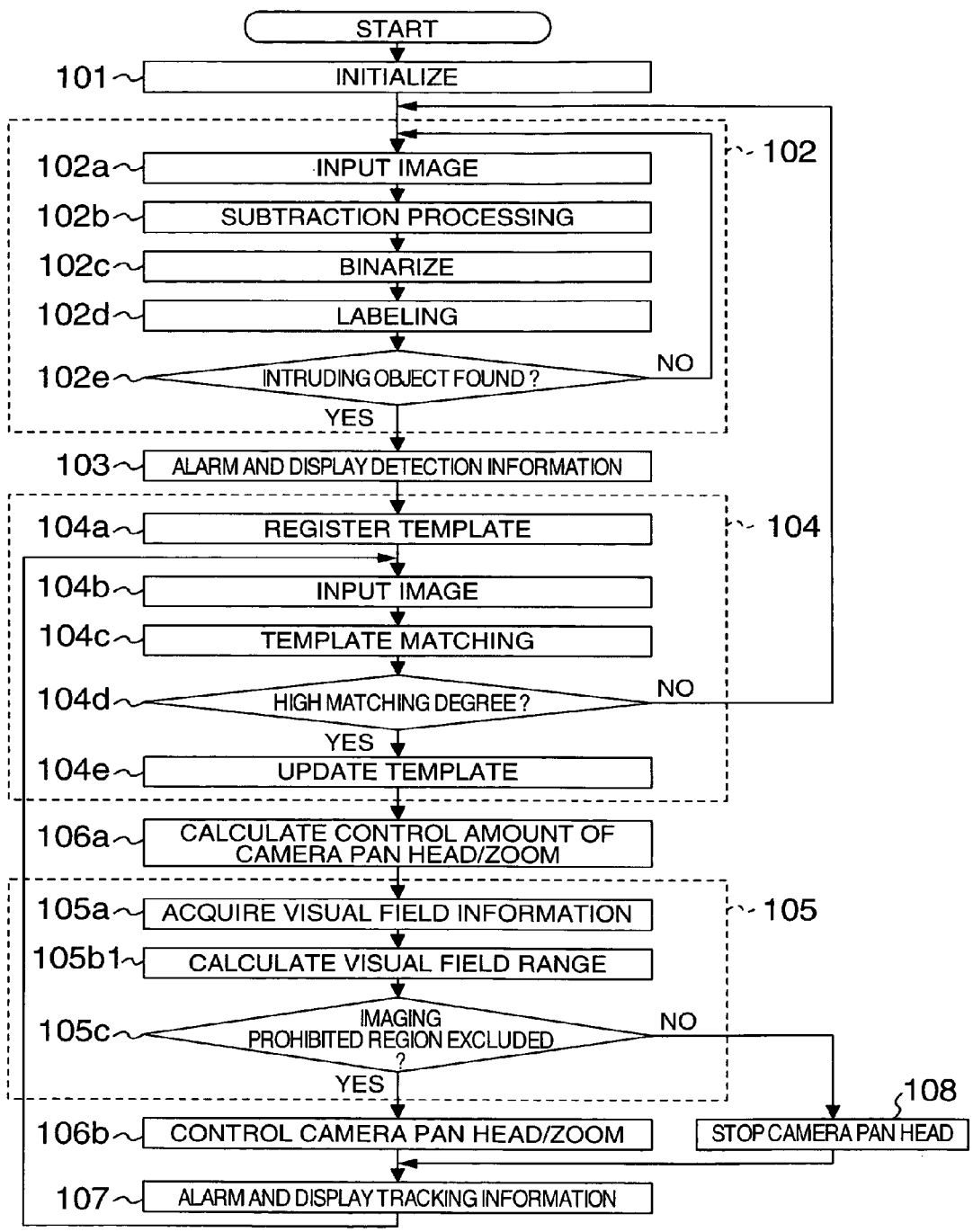
FIG. 10 is a flow chart illustrating the flow of an object tracking method according to another embodiment of the present invention.

In FIG. 10, at the camera pan head/zoom control amount calculation step 106a, a panning amount and a tilting amount of the camera pan head 201c and a zooming amount of the imaging lens 201b are calculated based on the position of an intruding object calculated at the template update step 104e. The calculations are made as previously described in connection with FIG. 5. At the visual field information acquisition step 105a, a current panning angle $\theta_P$ and a current tilting angle $\theta_T$ are acquired and a current focal length f of the imaging lens 201b is also acquired through the lens controller 202c. At the visual field range calculation step 105b1, the orientation (direction) of the camera pan head 201c after controlling of the camera pan head is predicted taking the current direction $\theta_P$ and $\theta_T$ acquired in the visual field information acquisition step 105a and pan and tilt amounts calculated in the step 106a into account and the pan angle $\theta_{P1}$ and tilt angle $\theta_{t1}$ are calculated which are the results of the prediction. Further, taking account of the current focal length of the imaging lens 201b acquired at the visual field information acquisition step 105a and the zooming amount of the imaging lens 201b calculated in step 106a, the focal length of the imaging lens 201b after controlling of the imaging lens 201b is predicted and the focal length f1 which is the result of the prediction, is calculated. And, the position of the imaging range is calculated based on the calculated direction $\theta_{P1}$ and $\theta_{t1}$ and the focal length f1 of the zooming lens 201b. The calculated position of the imaging range is a predicted position. Therefore, at the imaging prohibited region exclusion determination step 105c, it is determined whether or not the imaging prohibited region is included within the predicted visual field range after the camera pan head and zooming are controlled. At the camera pan head/zoom control step 106b, if the imaging prohibited region is not included in the predicted visual field range after controlling of the camera pan head and zooming, the camera pan head 201c and zooming lens 201b are controlled based on the control amounts calculated at the camera pan head/zoom control amount calculation step 106a.

According to this embodiment, whether or not a predicted visual field range includes an imaging prohibited region before the visual field range is actually updated, thereby making it possible to more accurately avoid imaging the imaging prohibited region and expect rapid tracking of an intruding object. Since this embodiment is similar to the flow chart of FIG. 1 except that it differs from FIG. 1 in that the camera pan head/zoom control amount calculation step 106a is placed between the template update step 104e and visual field acquisition step 105a and the visual field range calculation step 105b is replaced by the visual field range calculation step 105b1, further description is omitted.

As described above, in the present embodiment, the TV camera is controlled to change the panning direction, tilting direction, and focal point of the lens in order to track an intruding object, but once an imaging prohibited place is included in the visual field range of the TV camera, the position of the visual field range of the TV camera is controlled to exclude the imaging prohibited place, thereby making it possible to realize an extremely excellent TV camera visual field control which enables the TV camera to track an intruding object without fail, and prevents the TV camera from capturing the imaging prohibited place.

Figure 11:
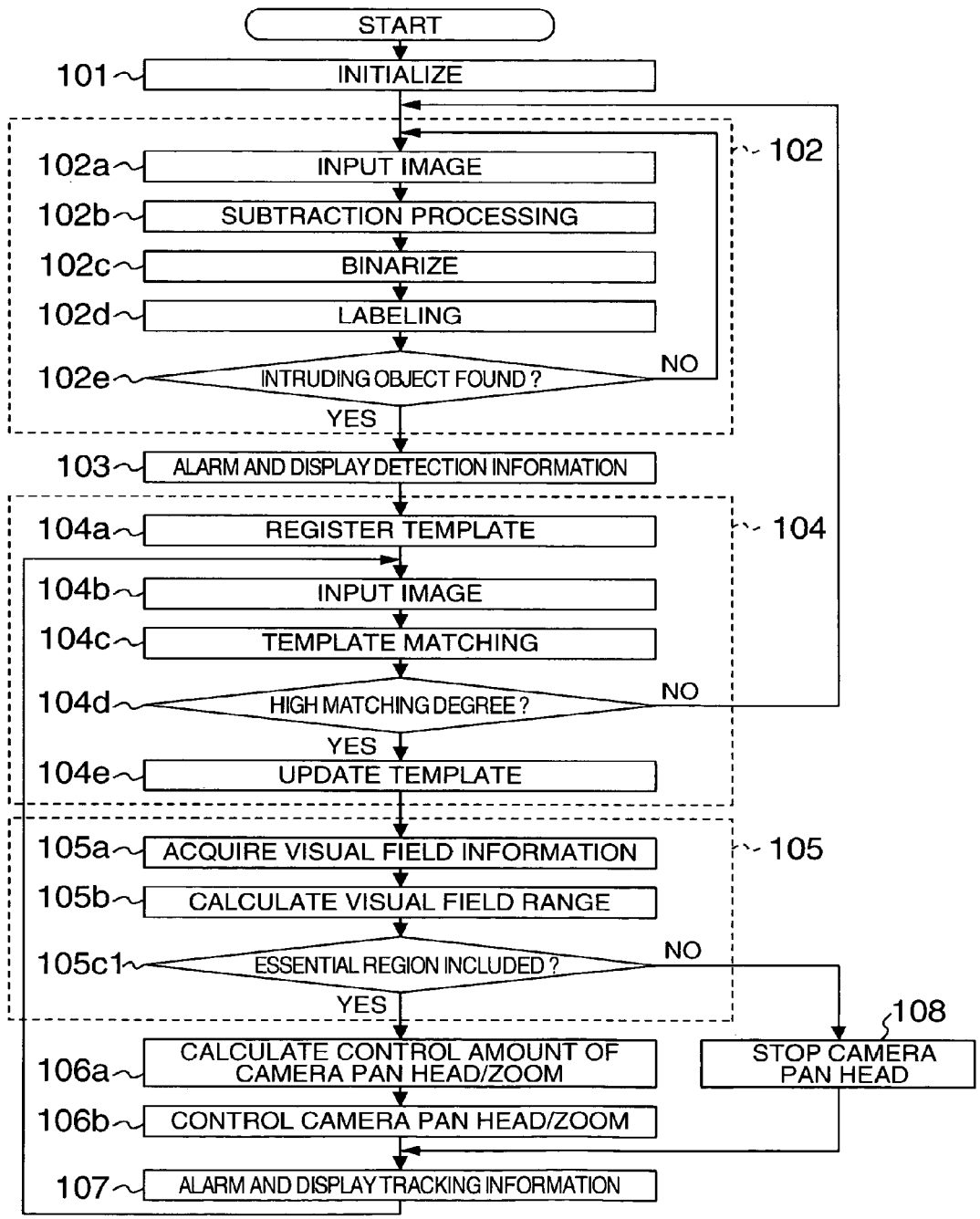
FIG. 11 is a flow chart illustrating the flow of an object tracking method according to a further embodiment of the present invention.

An intruding object tracking method according to a further embodiment of the present invention will be described with reference to FIG. 11. In the foregoing embodiments, the TV camera is prevented from capturing an imaging prohibited region within its visual field range, whereas a monitoring essential region may be defined within a monitor map such that an essential (important) region is captured without fail within the visual field range. In doing so, a detected intruding object can be tracked in a range in which the essential region is captured in the visual field range, so that the essential region can be imaged in addition to the intruding object. FIG. 11 is a flow chart illustrating such an intruding object tracking method according to one embodiment which can monitor the monitoring essential region at all times. The flow chart of FIG. 11 is similar to that of FIG. 1 except that the imaging prohibited region exclusion determination step 105c in FIG. 1 is replaced by an essential region inclusion determination step 105c1. Specifically, in the flow chart of FIG. 1, when an imaging prohibited region is included in the visual field range of the TV camera 201a, the flow takes the NO branch from the imaging prohibited region exclusion determination step 105c to stop the camera pan head 201c. In this embodiment, on the other hand, when the essential region is not included in the visual field range of the TV camera 201a, the flow takes a NO branch from the essential region inclusion determination step 105c1 to a camera pan head stopping step 108. At the camera pan head stopping step 108, the camera pan head 201c undergoes camera pan head stopping processing. Note that the camera pan head stopping step 108 is configured to stop the camera pan head 201c. Alternatively, the step 108 may be configured to control the pan and tilt motors of the camera pan head 201c to move in the reverse direction and stop after lapse of a predetermined time so that the orientation of the TV camera 201a is directed back to the inside of the essential region. Further, when the visual field of the TV camera 201a includes no part of the essential region, the camera pan head stopping step 108 may be adapted to cause the monitor 205 to display a message that the control of the camera pan head is stopped due to missing of the essential region, in addition to providing the camera pan head stopping processing.

It is also possible to combine the processing explained with reference to FIG. 1 and the processing explained with reference to FIG. 11 so as to control the zoom lens 201b and camera pan head 201c in such a manner that the imaging prohibited region is not included in the visual filed range of the TV camera and the essential region is always included in the view field range.

An intruding object tracking method according a further embodiment of the present invention will be described with reference to FIG. 12.

While all the foregoing embodiments are directed to automatic tracking of an intruding object, the present invention is not limited to such automatic tracking but can be applied to manual tracking of an intruding object as well.

Figure 12:
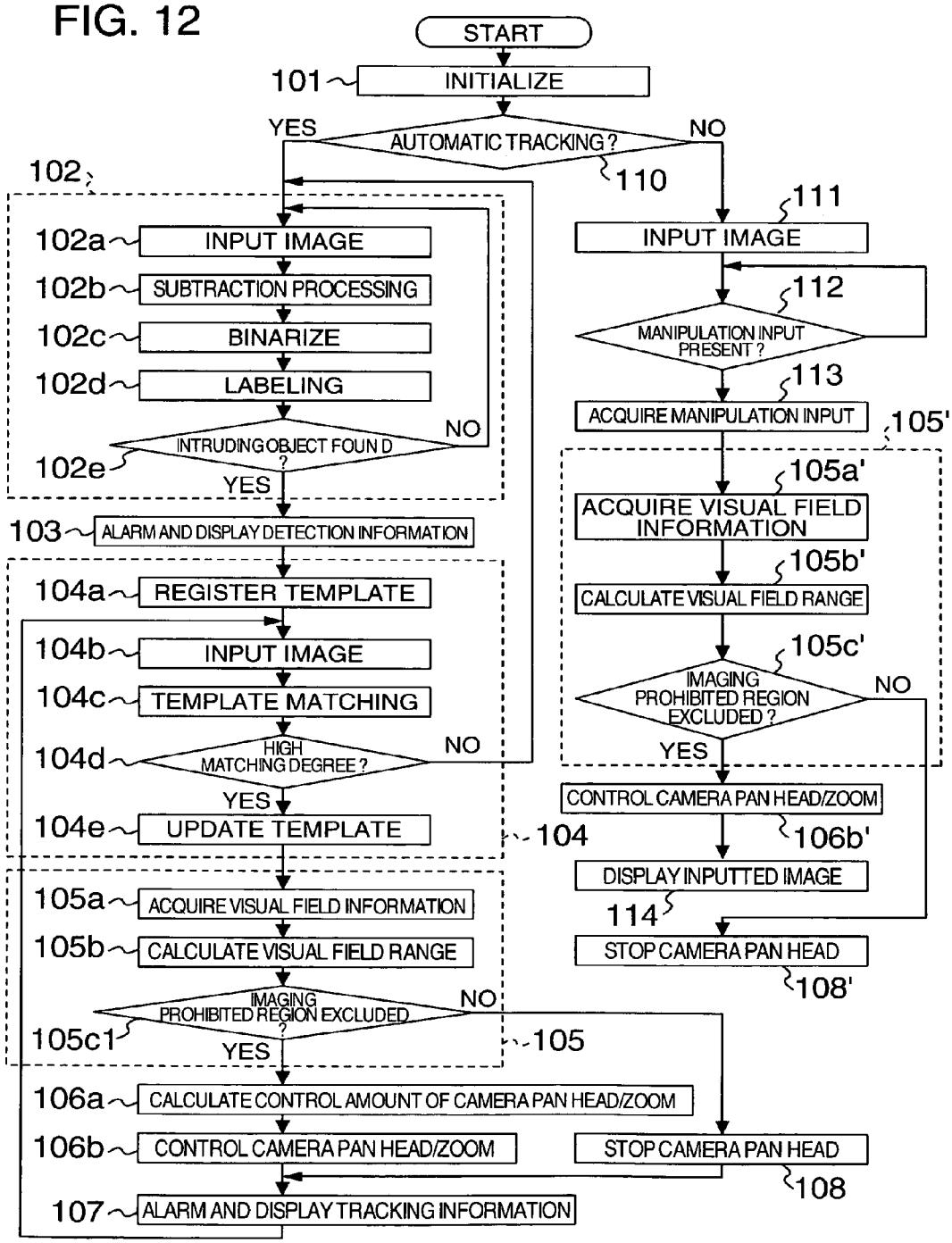
FIG. 12 a flow chart illustrating the flow of an object tracking method according to a further embodiment of the present invention.

A flow chart of FIG. 12 illustrates an intruding object tracking method which can avoid imaging an imaging prohibited region even during automatic tracking conducted by a watchman, in addition to the automatic tracking of an intruding object.

In FIG. 12, subsequent to the initialization step 101, the watchman (operator) selects automatic tracking or manual tracking (step 110). Upon selection of automatic tracking, the automatic tracking described with reference to FIG. 1 is executed. Upon selection of manual tracking, an input image, for example, having 320 pixels in the horizontal direction and 240 pixels in the vertical direction is captured from the TV camera 201a (step 111). The MPU 202f checks whether or not an operator manipulates the TV camera 201a for monitoring (step 112). The TV camera 201a is manipulated (for controlling an imaging direction) on the manipulation unit 203. The operator can also manually control the zooming of the TV camera 201a by means of the manipulation unit 203. Upon detection of a monitoring manipulation for the TV camera 201a, information on the manipulation input is acquired through the manipulation input unit 202d (step 113) and the processing proceeds to a visual field range determination step 105' which is a similar step to the visual field range determination step 105 in the automatic tracking. At the visual field information acquisition step 105a', the current direction of the camera pan head (indicated by a panning angle $\theta_P$ and a tilting angle $\theta_T$, where the origin is defined on the front of the camera pan head) is acquired through the pan head controller 202b, and a current focal length f of the imaging lens 201b is acquired through the lens controller 202c.

At a visual field range calculation step 105b', the position of the imaging range is calculated based on the current direction $\theta_P$, $\theta_T$ of the camera pan head 201c, and the current focal length f of the imaging lens 201b acquired at the visual field information acquisition step 105a. Since a method of calculating the position of the imaging range is as previously described, description thereon is omitted.

Next, at the imaging prohibited region exclusion determination step 105c', if the visual field range of the TV camera 201a calculated at the visual field range calculation step 105b' does not include any region (imaging prohibited region) other than a range under monitoring, the flow proceeds to a camera pan head/zoom control step 106b'. Conversely, if the visual field range of the TV camera 201a includes the imaging prohibited region, the flow proceeds to a camera pan head stopping step 108'.

At the camera pan head/zoom control step 106b', the TV camera 201a is moved in a direction specified by the operator based on the manipulation input information acquired in the manipulation input acquisition step 113, and at a subsequent input image display step 114, an image captured by the TV camera 201a is displayed on the monitor 205. When the manipulation input information acquired at the manipulation input acquisition step 113 includes information on an amount of zoom change, the zooming of the imaging lens 201c is also controlled at the camera pan head/zoom control step 106b'.

On the other hand, if the visual field range of the TV camera 201a calculated at the visual field range calculation step 105b' includes the region (imaging prohibited region) other than the range under monitoring, the camera pan head is stopped at the camera pan head stopping step 108'. In addition, control may be made to move the camera pan head in a reverse direction and a message may be displayed on the monitor 205 for announcing that the TV camera 201a is stopped because the imaging prohibited region is included in the visual field range of the TV camera 201a.

Since details on steps 105', 105a', 105b', 105c', 106', 108' are similar to previously described step 105, 105a, 105b, 105c, 106, 108, respectively, detailed description thereon is deemed to be unnecessary. It is a matter of course that even in conducting manual tracking by the watchman, it is possible to control such that the essential region is always included in the visual field range without fail, as in the case of the method explained in connection with FIG. 11. Further, in the description above the watchman manipulated the TV camera 201a through the manipulation unit 203 connected to the signal processor 202. However, it is also possible to manipulate the TV camera 201a by means of a remotely placed PC (personal computer) which is connected to the signal processor 202 through an external network such as LAN or the Internet.

While the foregoing embodiments have been described in connection with the subtraction method given as an example of the object detecting method and the template matching method given as an example of the object moving amount detecting method, it should be understood that methods other than those can be used as long as they can implement the object detection and object moving amount detection.

While the present invention has been described above in detail, it should be understood that the present invention is not limited to the object tracking method and object tracking apparatus described above, but can be widely applied to object tracking methods and object tracking apparatuses other than the foregoing.

The conventional object tracking methods and object tracking apparatuses have suffered from problems of private houses and a privacy sensitive place unintentionally captured by a TV camera, though they are not subjected to monitoring, and essential facilities within a field under monitoring hidden in a blind zone. According to the present invention, the camera pan head can be limited in its moving range such that private houses, privacy sensitive places, and the like are not captured by the TV camera, while an object is being tracked. In addition, an object can be tracked while essential facilities within the field under monitoring are captured without fail in the visual field of the TV camera.

According to the foregoing embodiments, an object can be tracked while essential facilities within a field under monitoring are kept captured without jeopardizing the privacy of general residents or capturing privacy sensitive places and the like. Thus, the resulting object tracking method and object tracking apparatus provided by the present invention can largely extend an applicable range of a video monitoring apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A tracking method for tracking an object using an imaging device configured for controlling at least one of an imaging direction and zooming, said method comprising the steps of:
   detecting the object based on an image from said imaging device;
   calculating a current or a predicted visual field range of said imaging device according to a X-Y coordinate system on a monitor map using X-Y coordinates of four corners of the current or predicted visual field range which has a shape of a trapezoid;
   determining whether or not the current or predicted visual field range includes an imaging prohibited region;
   controlling at least one of the imaging direction and zooming of said imaging device based on detected information of the object when the current or predicted visual field range does not include an imaging prohibited region; and
   tracking said object,
   wherein said determining step includes:
   comparing said imaging prohibited region represented in the X-Y coordinate system on the monitor map to a position of the current or predicted visual field range represented in the X-Y coordinate system on the monitor map to determine presence/absence of an overlap between said imaging prohibited region and the current or predicted visual field range,
   wherein the monitor map is stored in a memory and is a plane view taken from directly above said imaging device, and
   wherein said position of the current or predicted visual field range represented in the X-Y coordinate system on the monitor map is obtained by the calculating step.

2. A method according to claim 1, further comprising the step of:
   stopping the operation of said imaging device when the calculated or current visual field range includes an imaging prohibited region.

3. A method according to claim 1, further comprising the step of:
   operating said imaging device in an opposite direction for a predetermined time and stopping the operation of said imaging device when the calculated or current visual field range includes an imaging prohibited region.

4. A method according to claim 1, further comprising the step of:
   masking an imaging prohibited region included in a captured image when the captured image of the calculated current or predicted visual field range includes the imaging prohibited region.

5. A method according to claim 1, further comprising the step of:
   displaying a message which indicates that operation of said imaging device is stopped because said imaging prohibited region is detected.

6. A method according to claim 1, wherein said step of:
   calculating the predicted visual field range of said imaging device includes the steps of:
   calculating a moving amount of said imaging device based on a positional relationship between a current position of the object and a predetermined position within the image; and
   calculating the predicted visual field range based on a control amount of said imaging device including the moving amount.

7. A method according to claim 1, further comprising the step of:
   when said current or predicted visual field range includes said imaging prohibited region, calculating a visual field range that does not include said imaging prohibited region and controlling at least one of the imaging direction and zooming of said imaging device based on the calculated visual field range.

8. A method according to claim 1, further comprising the step of:
   making the focal length of said imaging device longer by a predetermined amount when said current or predicted visual field range includes said imaging prohibited region.

9. An object tracking apparatus comprising:
   an imaging device;
   a driving mechanism coupled to said imaging device for changing the position of a visual field range of said imaging device;
   an image signal processor for processing an image signal from said imaging device; and
   a controller for controlling said driving mechanism in response to a control signal from said image signal processor,
   wherein said image signal processor includes:
   means for detecting an object based on an image from said imaging device;
   means for calculating a current or a predicted visual field range of said imaging device according to a X-Y coordinate system on a monitor map using X-Y coordinates of four corners of the current or predicted visual field range which has a shape of a trapezoid;
   means for determining whether or not the calculated current or predicted visual field range includes an imaging prohibited region; and
   means responsive to said determining means for generating the control signal for controlling at least one of the imaging direction and zooming of said imaging device based on detected information on the object when said determining means determines that the calculated current or predicted visual field range does not include an imaging prohibited region,
   wherein said means for determining includes:
   means for comparing said imaging prohibited region represented in the X-Y coordinate system on the monitor map to a position of the current or predicted visual field range represented in the X-Y coordinate system on the monitor map to determine presence/absence of an overlap between said imaging prohibited region and the current or predicted visual field range,
   wherein the monitor map is stored in a memory and is a plane view taken from directly above said imaging device, and
   wherein said position of the current or predicted visual field range represented in the X-Y coordinate system on the monitor map is obtained by the means for calculating.

10. An apparatus according to claim 9, wherein said driving mechanism includes a zooming controller for controlling the zooming of said imaging device, and a pan head controller for controlling the imaging direction of said imaging device.

11. A method for determining whether an intruding object exists within a field being monitored comprising the steps of:
   executing an object recognition process based on a subtraction method to detect an intruding object including:

executing a first image input process to capture an input image of a field being monitored from an image pickup device, first calculating a difference value of luminance at each pixel between the captured input image and a reference background image, which does not include any intruding object, previously created and recorded in an image memory, binarizing into a pixel value the difference value of luminance at each pixel onto a differential image, wherein a pixel value lower than a predetermined threshold is set to "0," and a pixel value equal to or higher than the threshold is set to "255" to generate a binary image, labeling blocks of pixels having the pixel value of "255" and numbering the labeled blocks to distinguish the respective blocks from one to another, and determining whether an intruding object exists within the field being monitored if any block of pixels having the pixel value "255," numbered at the labeling step, meets predetermined conditions;

if it is determined that an intruding object exists in the field being monitored, then alarm/detection information is displayed on a display screen and if it is determined that an intruding object does not exist in the field being monitored, then the object recognition process is executed again;

if it is determined that an intruding object exists in the field being monitored, then a template matching process is performed including:

performing a template registration process where an image of the intruding object is marked off by an extractor to generate a template image which includes a representative template of the intruding object, said representative template is registered as an initial template for the template matching process, executing a second image input process to capture an input image of the field being monitored from the image pickup device, performing a template matching process to detect a degree of matching between the image of the object captured by the second image input process and the representative template, determining whether the degree of matching between the image of the object captured by the second image input process and the representative template is higher than a predetermined threshold, if the degree of matching is lower than the predetermined threshold, then the object recognition process is executed again, and if the degree of matching is higher than the predetermined threshold, then a template update process is performed where the image of the intruding object is marked off from the input image captured at the second image input process and is defined to be a new representative template;

second calculating a panning amount, a tilting amount and a zooming amount of the image input device based on a position of the intruding object calculated by the template update process;

executing a visual field range determination process for preventing the image input device from capturing in the field to be monitored an area which is not to be monitored and preventing the image input device from capturing in the field to be monitored a privacy sensitive area including:

acquiring a current direction and a focal length of the image input device, third calculating a predicted visual field range of the image input device based on the current direction and focal length acquired in the acquiring step and the panning, tilting and zooming amounts calculated in the second calculating step, and determining whether an imaging prohibited region is excluded from the predicted visual field range;

if the imaging prohibited region is not excluded from the predicted visual field range, then panning of the image input device is stopped and alarm and tracking information is displayed on the display screen; and if the imaging prohibited region is excluded from the predicted visual field range, then panning and zooming of the image input device is controlled based on the panning, tilting and zooming amounts calculated at the second calculating step and alarm and tracking information is displayed on the display screen.

* * * * *